United States Patent
Solimar Walter

(10) Patent No.: US 12,538,871 B2
(45) Date of Patent: Feb. 3, 2026

(54) DRIVE SYSTEM FOR COMBINE HARVESTER PROCESSOR

(71) Applicant: AGCO do Brasil Soluções Agrícolas Ltda., Ribeirao Preto (BR)

(72) Inventor: Airton Solimar Walter, Canoas (BR)

(73) Assignee: AGCO do Brasil Soluções Agrícolas Ltda., Ribeirao Preto (BR)

( * ) Notice: Subject to any disclaimer, the term of this patent is extended or adjusted under 35 U.S.C. 154(b) by 938 days.

(21) Appl. No.: 17/661,506

(22) Filed: Apr. 29, 2022

(65) Prior Publication Data

US 2022/0346320 A1    Nov. 3, 2022

(30) Foreign Application Priority Data

Apr. 30, 2021 (GB) .................. 2106242

(51) Int. Cl.
| | | |
|---|---|---|
| *A01D 69/06* | (2006.01) | |
| *A01D 41/12* | (2006.01) | |
| *A01F 7/06* | (2006.01) | |
| *A01F 12/56* | (2006.01) | |

(52) U.S. Cl.
CPC .............. *A01F 12/56* (2013.01); *A01D 69/06* (2013.01); *A01D 41/12* (2013.01); *A01F 7/06* (2013.01)

(58) Field of Classification Search
CPC .... A01D 69/00–69/12; A01D 41/1246; A01D 69/06; A01D 41/12; A01F 12/56; A01F 7/06
See application file for complete search history.

(56) References Cited

U.S. PATENT DOCUMENTS

| | | | |
|---|---|---|---|
| 9,848,537 B2 | 12/2017 | Bojsen | |
| 2004/0043847 A1* | 3/2004 | Jonckheere | ........ A01D 41/1274 |
| | | | 474/33 |
| 2025/0151663 A1* | 5/2025 | Duquesne | .............. A01D 69/06 |

FOREIGN PATENT DOCUMENTS

| | | | | | |
|---|---|---|---|---|---|
| CN | 201624016 U | * | 11/2010 | ............. | A01D 41/02 |
| FR | 2058646 A5 | * | 5/1971 | | |
| GB | 2057843 A | * | 4/1981 | ............... | A01F 7/06 |
| JP | 2022012790 A | * | 1/2022 | | |
| WO | 02/074063 A1 | | 9/2002 | | |
| WO | WO-2014141792 A1 | * | 9/2014 | ............. | A01D 69/10 |

OTHER PUBLICATIONS

UK Intellectual Property Office, Search report for UK priority Application No. GB2106242.7, dated Oct. 27, 2021.

* cited by examiner

*Primary Examiner* — Joseph M Rocca
*Assistant Examiner* — Madeline I Runco

(57) ABSTRACT

A combine harvester including one or two axial flow crop processors each with a rotor mounted for rotation inside a rotor housing that is arranged substantially longitudinally with respect to the harvester. A feed beater is mounted for rotation on a substantially transverse axis and serves to tangentially impel crop material into the crop processor(s). A drive system is provided for driving the rotor and the feed beater. A drive connection is provided between the rotor and the feed beater and includes a gear that is keyed to a rotor shaft of the rotor in front of a rotor drum.

3 Claims, 5 Drawing Sheets

DRIVE SYSTEM FOR COMBINE HARVESTER PROCESSOR

CROSS-REFERENCE TO RELATED APPLICATIONS

This application claims priority to United Kingdom patent application No. 2106242.7, filed Apr. 30, 2021, the content of which is incorporated herein by reference.

FIELD

The invention relates to drive systems for driving an axial-flow crop processing system and feed beater in a combine harvester. The feed beater is mounted for rotation on a substantially transverse axis and serves to tangentially impel crop material into an axial flow crop processor.

BACKGROUND

For many decades self-propelled combine harvesters have been used by farmers to harvest a wide range of crops including cereals, maize and oil seed rape. Typically a combine harvester cuts the crop material, threshes the grain therefrom, separates the grain from the straw and cleans the grain before storing in an on-board tank. Straw and crop residue is ejected from the rear of the machine.

The crop processor of a combine harvester comprises threshing and separating apparatus. The separating apparatus is traditionally based upon one of two well-established systems. In a first known system straw walkers are used to 'walk' the crop stream rearwardly in the combine wherein agitation caused by this movement causes the grain to fall through an integrated grate whilst the straw residue falls from the rear and out of the combine. In the second alternative system one or two cylindrical rotors are mounted within the combine longitudinally and enclosed by rotor cages wherein crop fed in at the front by a tangential-flow impelling feed beater, travels rearwardly in an axially spiral motion due to interacting crop engaging elements fitted to the rotor tube and guide vanes fitted on the inside of the rotor cage. The cylindrical rotors can provide a threshing and separating action, or a separating action only. Separated grain falls through a grate in the cage whilst the straw residue is conveyed rearwardly and out of the machine. The invention is concerned with driving a feed beater in this second system of separating apparatus.

The feed beater is commonly driven by a belt-drive system comprising belts and pulleys, the beater drive typically comprising a power branch deriving its torque from a main drive system driven by an internal combustion engine. A clutch is typically included in the driveline to allow the operator to selectively engage and disengage the crop processing apparatus which includes, inter alia, the feed beater, the separating apparatus and a grain cleaning shoe.

Combine harvesters are utilized for harvesting a wide range of different crops. It is recognised that certain crops, such as corn or beans, can become damaged if the feed beater rotates too fast. When the feed beater is drivingly connected to the other crop processing systems or indeed the engine, it is not possible or practical for the operator to slow down the feed beater without affecting the other systems without the provision of a separate multi-ratio drive to the feed beater.

It is known to provide a stepped multi-ratio drive system for a feed beater but such systems involve many additional components and, as a result, are expensive. Moreover, changing the drive speed of the beater is cumbersome and cannot be done whilst the harvester is operating.

U.S. Pat. No. 9,848,537 discloses a combine harvester with an axial-flow processor having rotors that are driven from the rear end by a rotor drive device, and a belt drive connection from the rotor drive device to the feed beater. Whilst the belt drive connection delivers a proportional drive speed between the feed beater and the drive rotors, there is a desire to reduce the number of parts and long belt runs.

BRIEF SUMMARY

According to an aspect of the invention there is provided a combine harvester comprising an axial flow crop processor with a rotor mounted for rotation inside a rotor housing arranged substantially longitudinally with respect to the harvester, a feed beater mounted for rotation on a substantially transverse axis and serving to tangentially impel crop material into the crop processor, a drive system for driving the rotor and the feed beater, and a drive connection between the rotor and the feed beater, wherein the rotor comprises a drum mounted upon a rotor shaft and wherein the drive connection comprises a first spur gear that is keyed to the rotor shaft in front of the drum. By providing a drive connection between the feed beater and the front of the rotor a proportional drive relationship can be achieved without the need for long belt drives.

In one embodiment the drive system includes a rotor drive device for transmitting torque from a drive stage to the rotor shaft. The rotor drive device is connected to a rear end of the rotor and comprises a transverse driveshaft driven by the drive stage and a gearbox arranged to transfer motion from the transverse driveshaft to the rotor shaft, and wherein the torque is transmitted to the feed beater via the rotor shaft. Advantageously, the rotor shaft itself is utilised to transfer the drive torque from the rotor drive device to the feed beater thus avoiding the need for a separate driveline on the side of the harvester.

The axial flow crop processor may have a single or dual-rotor arrangement. In the latter case the drive connection is preferably connected to only one of the rotors to save on components for the front-end drive connection.

In another embodiment the drive stage is instead connected to the feed beater so that a drive torque is transmitted from the drive stage to the rotor shaft via the feed beater. Advantageously, the feed beater itself is utilised to transfer a drive torque to the crop processing rotors thus avoiding the need for a separate gearbox at the rear of the rotors.

In another embodiment the drive connection further comprises a first transfer shaft that is journaled for rotation on an axis that is parallel to the rotor, a second spur gear keyed to the first transfer shaft and meshed with the first spur gear, a first bevel gear keyed to the first transfer shaft, a second transfer shaft journaled for rotation on a substantially transverse axis, a second bevel gear keyed to the second transfer shaft and meshed with the first bevel gear, and a torque transfer connection between the second transfer shaft and the feed beater. The second transfer shaft extends transversely with respect to the normal forward direction of travel. A drive stage may instead be connected to the second transfer shaft to deliver a common drive torque to both the feed beater and the processing rotors which are in driving connection therewith.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Further advantages of the invention will become apparent from reading the following description of a specific embodiment with reference to the appended drawings in which.

DETAILED DESCRIPTION

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the associated rotation axis.

Figure 1:
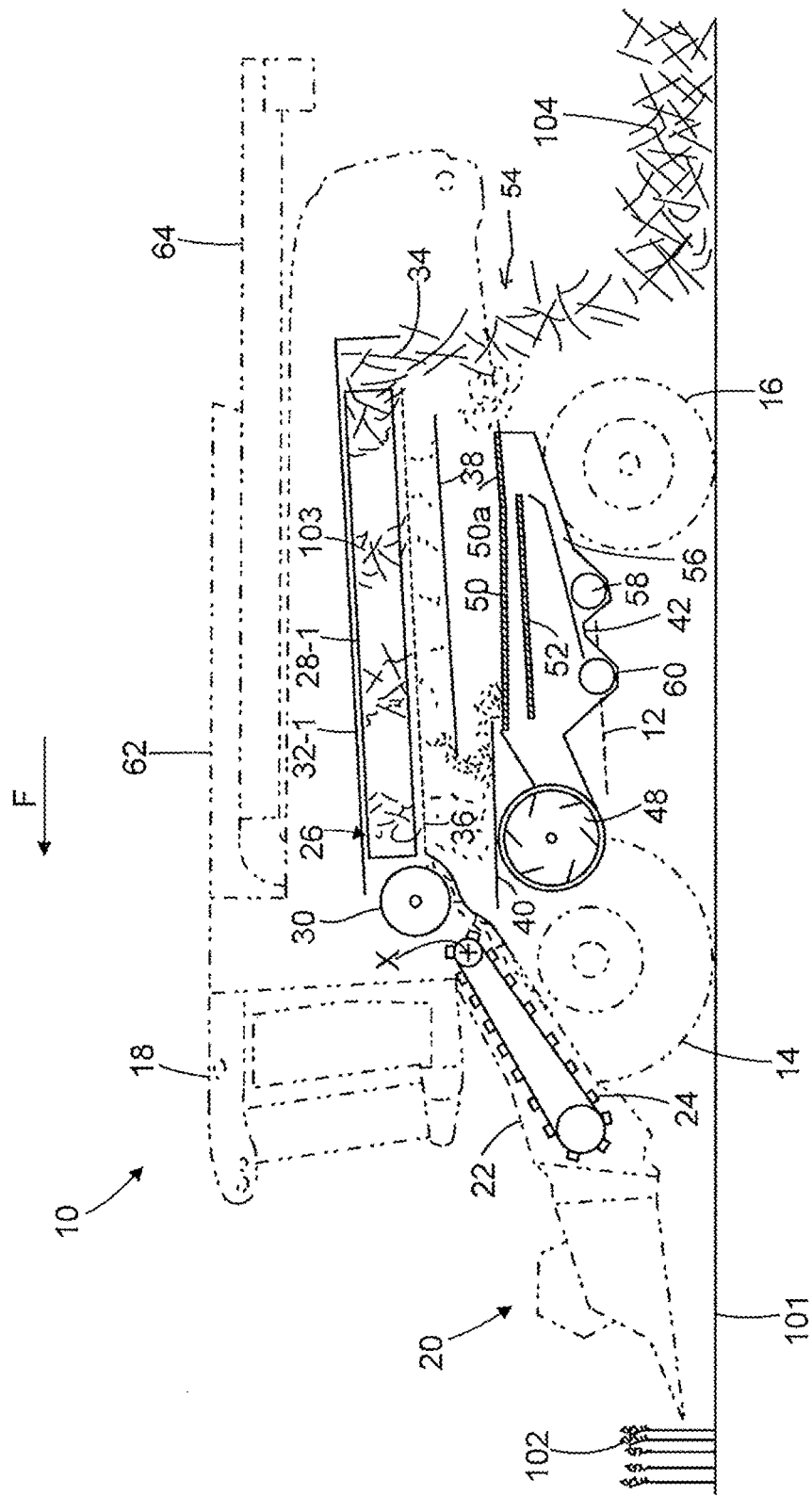
FIG. 1 is a schematic left-side view of combine harvester showing the internal workings thereof.
Figure 2:
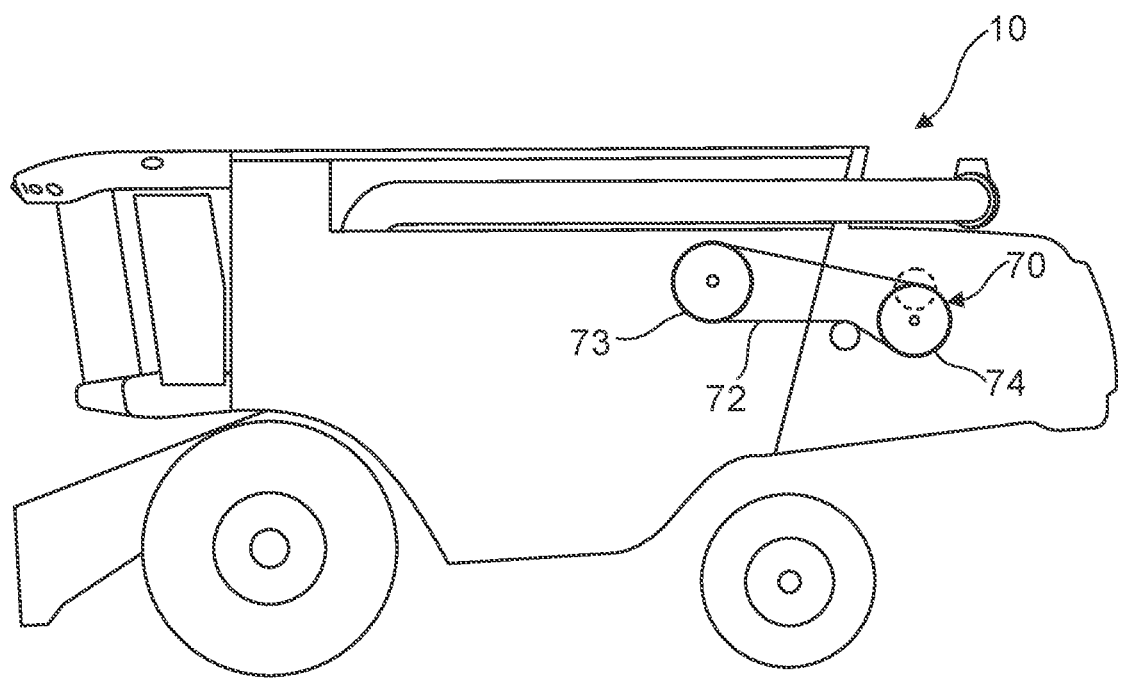
FIG. 2 is a schematic representation of a part of a feed beater drive system of the combine harvester of FIG. 1 according to a first embodiment of the invention, viewed from the left-hand side.

FIG. 1 illustrates in schematic form the main components of the crop processing systems of a combine harvester 10 and will be used to explain the flow of material below. The crop processing system is shown in solid lines whilst the outline profile of harvester 10 is shown in ghost form. Thereafter, specific embodiments of the invention will be described.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, in the form of a chain and slat elevator, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28-1, 28-2 fed by a tangential flow, crop material impelling, feed beater 30. In an alternative embodiment, a single axial-flow processing rotor may be employed.

The feed beater 30 rotates on a transverse axis and comprises crop engaging elements 31 (FIG. 4) which convey the crop material stream under the beater and into rotor housings 32 which houses said respective rotors 28. It should be appreciated that only the left-hand rotor 28-1 and housing 32-1 is shown in FIG. 1 whereas the right-hand equivalent is hidden from view.

The rotors 28 is positioned to have a generally longitudinal, or fore and aft, rotation axis which is normally inclined upwardly towards the rear of the combine 10.

Flighting elements (not shown) provided on the front end of rotors 28 engage the crop material stream which is then conveyed as a ribbon or mat 103 in a generally rearward axial and helical path in the space between the rotors 28 and the respective rotor housing 32.

Axial flow rotors 28-1, 28-2 serves to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a grain pan 40 located below a front section of the processor 26. In reality the separated material falling through the grate 36 is typically a mix of grain and material other than grain (MOG) which may include chaff, tailings and some straw.

The return pan 38 and grain pan 40 convey the separated crop material to a grain cleaning shoe designated generally at 42. The grain-MOG mix falls from the rear edge of the grain pan 40 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow un-threshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

An internal combustion engine (not shown) provides power to drive the propulsion and crop processing systems of the combine 10. A clutch (not shown) allows an operator to selectively engage and disengage the crop processing systems, often collectively termed as the 'threshing gear'.

The crop processing systems include the header 20, elevator 24, processing (or threshing/separating) rotors 28-1, 28-2, conveyance pans 38, 40, the cleaning shoe 42, and the clean grain elevator (not shown). These systems may be grouped so as to be driven, engaged and disengaged simultaneously. Each of these system typically includes a respective intermediate drive stage for transferring power thereto from the engine.

One intermediate drive stage is referenced at 70 and is driven by the internal combustion engine (not shown) via a variator belt drive 72 positioned on the left-hand side of combine 10. The variator belt drive 72 comprises a V-belt which is trained around a driving pulley 73 and a driven pulley 74. The driving pulley 73 is drivingly connected to the internal combustion engine whereas the driven pulley 74 is keyed onto a driveshaft of the drive stage 70.

The pulleys 73, 74 are variator pulleys which are controlled in a known manner to steplessly adjust the rotor drive speed with respect to the engine speed in response to operator commands. It should be appreciated that the rotor drive may comprise alternative variable speed transmission arrangements including a hydrostatic system for example.

It should be understood that the belt drive 72 which delivers power from the engine to the drive stage 70 is illustrated and described by way of example and in a schematic form.

Figure 4:
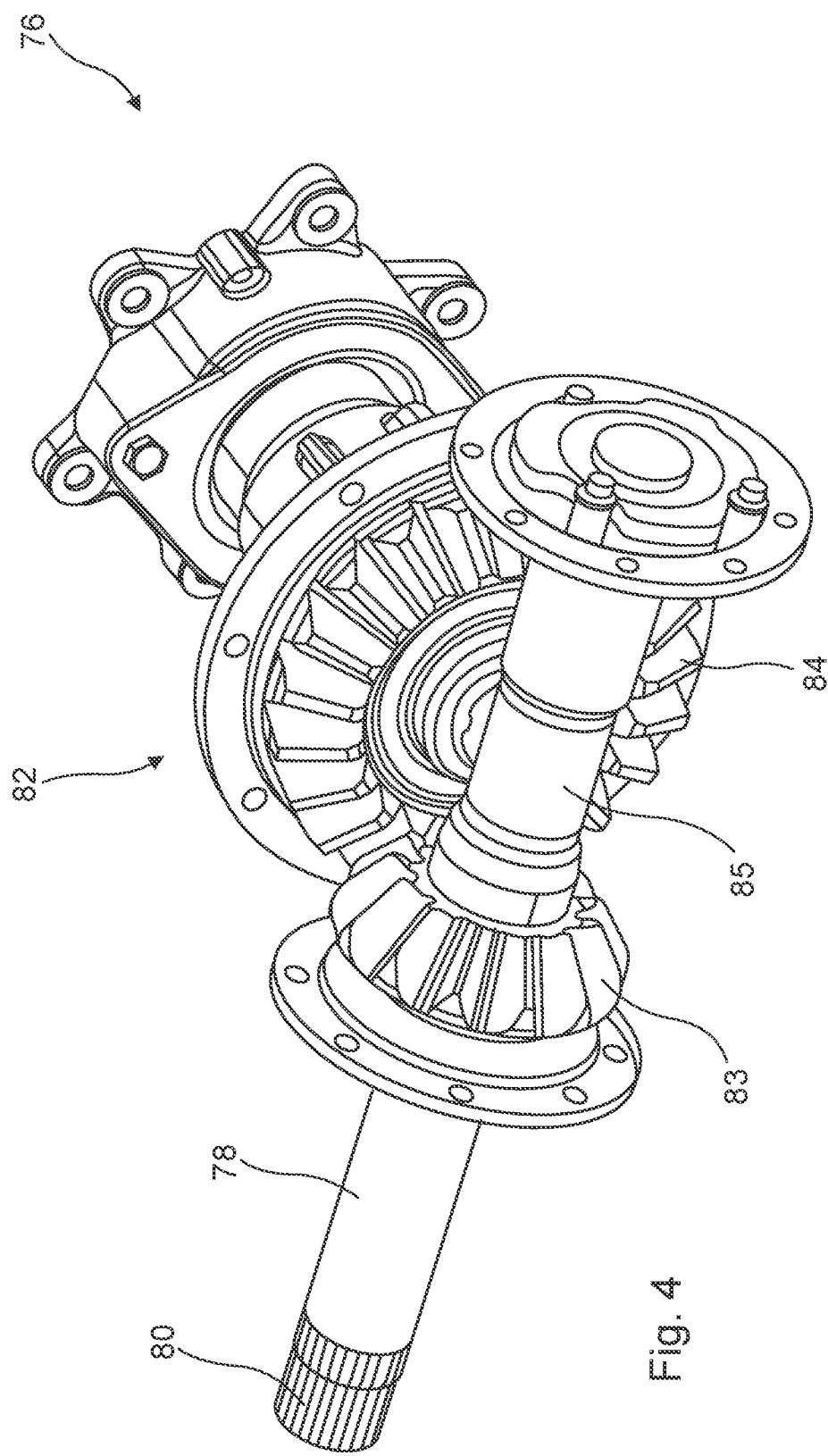
FIG. 4 is a rear right perspective view of a rotor drive device embodied in the feed beater drive system of FIG. 2.

The drive stage 70 has an output connected to a rotor drive device 76-1 shown in FIG. 4. It should be appreciated that only one rotor drive device for the drive of one rotor is shown in FIG. 4 and that a second rotor drive device 76-2 is provided for the drive of the right-hand rotor 28-2.

In more detail, the rotor drive device 76-1 comprises a transversely-orientated shaft 78 having a splined portion 80 on the left-hand side to engage a receiving female component (not shown) associated with the drive stage 70. The shaft 78 passes through a rotor gear box referenced generally at 82-1, the casing of which is omitted from FIG. 4 to reveal the inner workings thereof.

Rotor gearbox 82-1 comprises a pair of bevel gears 83, 84 for transferring power from the shaft 78 to the rotor 28-1. A first bevel gear 83 is keyed onto transverse shaft 78 whereas a second bevel gear 84 is keyed onto a longitudinal rotor shaft 85-1 which forms part of rotor 28-1. The rotor gearbox 82-1 is located in the vicinity of crop discharge opening 34.

Figure 5:
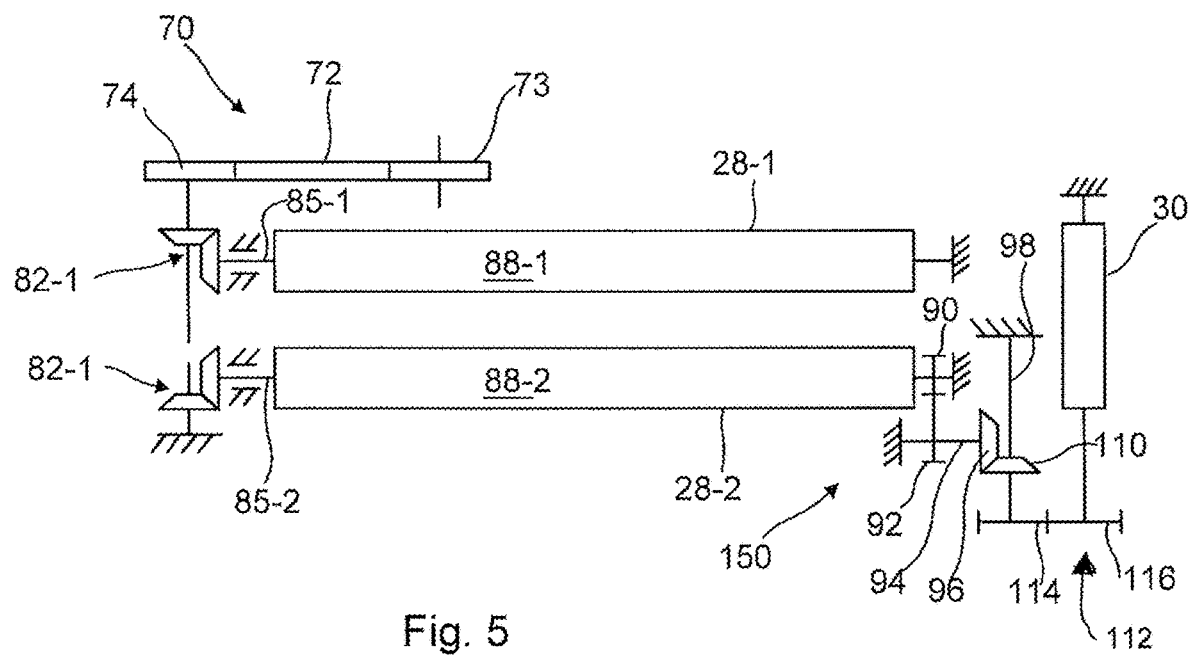
FIG. 5 is a schematic plan view of the feed beater drive system of FIG. 2.
Figure 6:
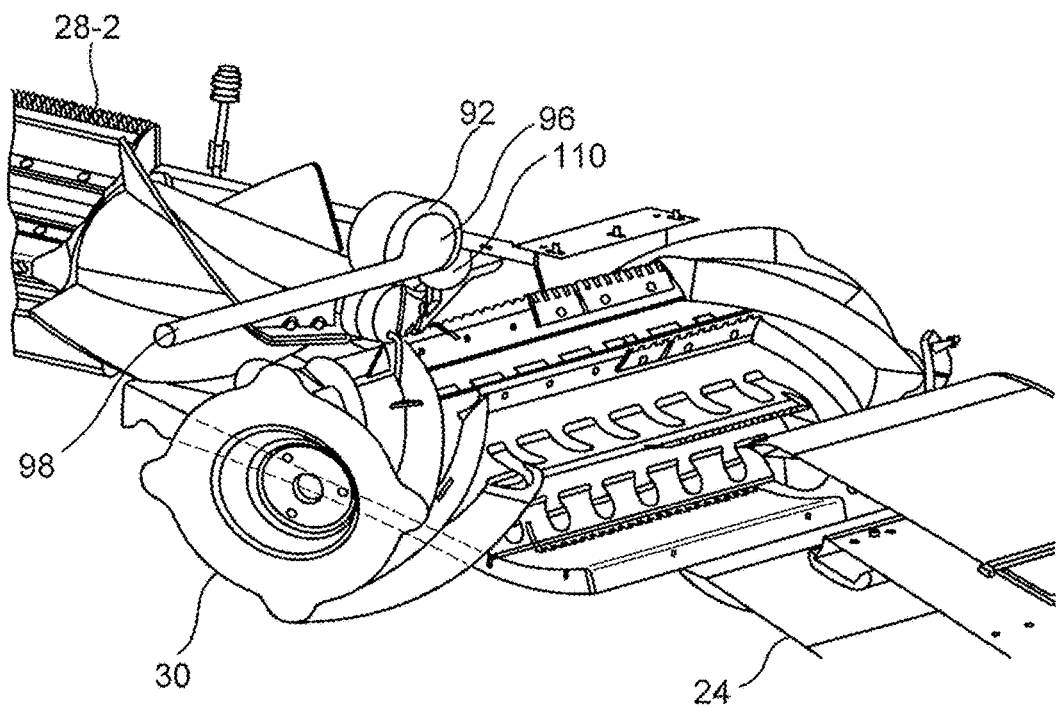
FIG. 6 is a perspective view of the feed beater and processing rotor with the drive connection shown schematically in accordance with the first embodiment.

The casing of rotor gearbox 82-1 is secured relative to the frame 12 of combine 10. The shaft 78 is journaled to the casing to support the shaft in rotation on a transverse axis coaxial therewith. A second rotor gearbox (not shown in FIG. 4) is coupled to the output of transverse shaft 85 as illustrated in FIG. 5 and serves to drive the right-hand rotor 28-2 in the opposite direction to that of left-hand rotor 28-1.

Each rotor 28-1, 28-2 comprises the rotor shaft 85-1, 85-2 and a rotor drum 88-1, 88-2 represented only schematically in the figures. Each rotor shaft 85 is journaled to the frame 12 at each end for rotation.

A drive connection 150 is provided between the front end of one rotor (the right-hand rotor 28-2 in the illustrated example) and the feed beater 30 so as to drive the latter with a speed that is proportional to the rotors 28. The drive connection 150 comprises a first gear 90 keyed to the front end of the shaft 85 in front of the drum 88 of one of the rotors. The first gear 90 meshes with a second gear 92 which is keyed onto a first transfer shaft 94. The first transfer shaft 94 is substantially parallel with the axis of the rotor 28 and is journaled to the frame 12 for rotation. Whilst FIG. 5 shows the second gear 92 being offset to one side of the first gear 90, it should be appreciated that these gears may be arranged differently. For example, the second gear 92 may be instead vertically aligned above the first gear 90.

A first bevel gear 96 is keyed to the first transfer shaft 94. A second transfer shaft 98 is journaled to the frame 12 for rotation on a substantially transverse axis. A second bevel gear 110 is keyed to the second transfer shaft 98 and meshes with the first bevel gear 96.

Figure 3:
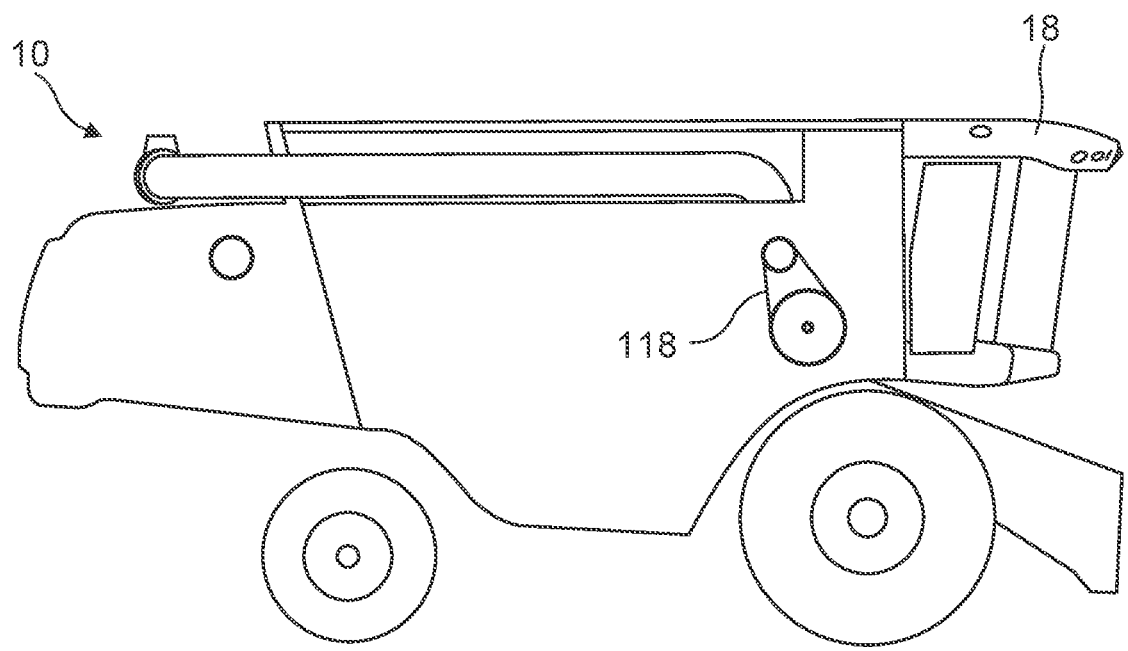
FIG. 3 is a schematic representation of another part of the feed beater drive system of FIG. 2, viewed from the right-hand side.

A torque transfer connection 112 is provided between the second transfer shaft 98 and the feed beater 30. The torque transfer connection 112 may comprise a pair of meshed gears 114, 116 as shown in FIG. 5. Alternatively, a belt or chain drive 118 may be provided as shown in FIG. 3.

The drive connection 150 serves to transfer drive from the rotor drive device 76 to the beater 30 thus ensuring a directly proportional driving speed relationship. Therefore, the operating speed of the beater 30 is adjusted together with the speed of the rotor 28 by means of the variator belt drive 72.

Figure 7:
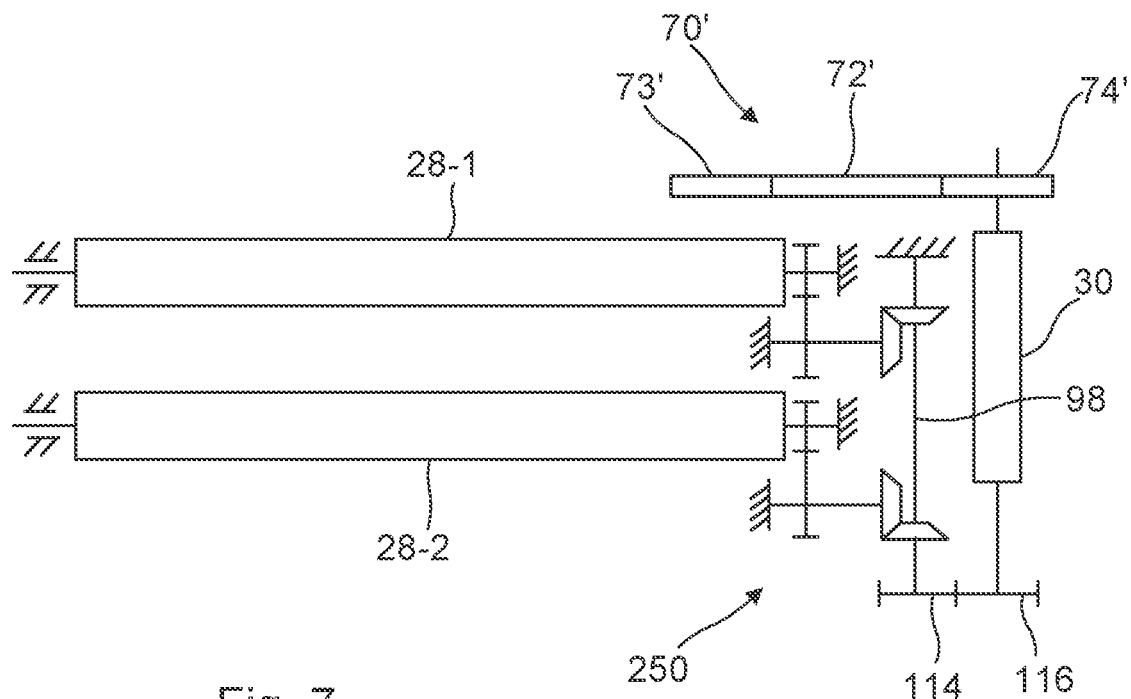
FIG. 7 is a schematic plan view of a drive system in accordance with a second embodiment; and, FIG. 8 is a schematic plan view of a drive system in accordance with a third embodiment.

In an alternative embodiment illustrated schematically in FIG. 7, the processing rotors 28 are driven via the feed beater 30. An alternative drive connection 250 is the same as drive connection 150 except for an additional connection between the second transfer shaft 98 and the second left-hand rotor 28. In other words, each of the rotors 28-1, 28-2 are drivingly connected at their front ends to the second transfer shaft 98 by the same gear arrangement as described with reference to FIG. 5.

Furthermore, comparing to the previous embodiment, an intermediate drive stage 70' is instead connected so as to drive the feed beater directly. The intermediate drive stage 70' is driven by the internal combustion engine (not shown) via a variator belt drive 72' positioned on the left-hand side of combine 10. The variator belt drive 72' comprises a V-belt which is trained around a driving pulley 73' and a driven pulley 74'. The driving pulley 73 is drivingly connected to the internal combustion engine whereas the driven pulley 74 is keyed onto the driveshaft of feed beater 30.

By driving the rotors 28 via the feed beater 30 and drive connection 250, there is no need for a drive arrangement at the rear of the rotors 28.

Figure 8:
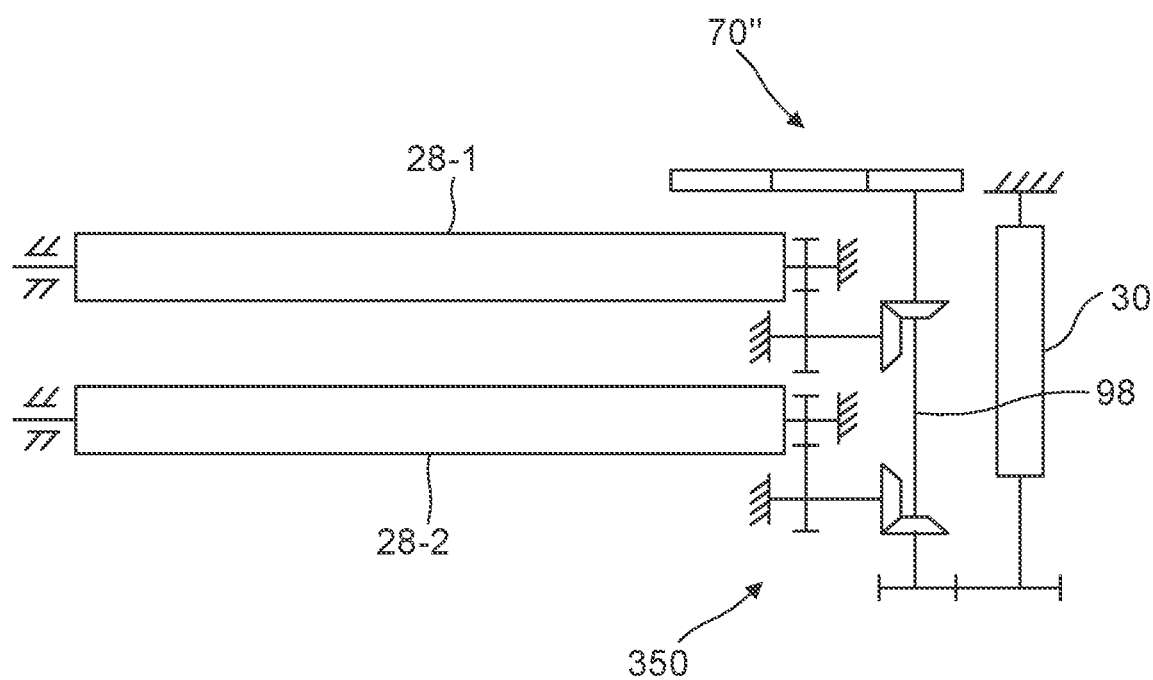

In another alternative embodiment illustrated in FIG. 8, a drive stage 70" is connected to the second transfer shaft 98 of the drive connection 350, wherein a drive torque is transmitted from the drive stage 70" to the rotor shafts 85-1, 85-2 and the feed beater 30 via the second transfer shaft 98. In other words, the second transfer shaft 98 is driven by the drive stage 70". Both rotors 28-1, 28-2 and the feed beater 30 are drivingly connected to the second transfer shaft 98 and derive torque therefrom. The drive connection 350 is the same as drive connection 250 described in relation to FIG. 7. The primary difference of the embodiment of FIG. 8 compared to FIG. 7 is that the drive stage 70" is connected to the second transfer shaft 98. As such, the feed beater 30 derives torque via the second transfer shaft 98.

In summary there is provided a combine harvester with an axial flow processor which is fed by a feed beater. A drive connection is provided between the feed beater and the front end of the processing rotors which ensures that the feed beater rotates at a speed that is proportional to the speed of the rotors. As such, the speed of both may be varied by a single variator. In one embodiment the feed beater is driven via one or both of the rotors and the drive connection. In another embodiment the rotors are driven via the feed beater and the drive connection. I yet another embodiment a drive stage is connected to a component of the drive connection wherein the feed beater and rotors derive torque therefrom.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various machine types and configurations.

The invention claimed is:

1. A combine harvester comprising:
a frame;
a feederhouse pivotably attached to the frame for pivoting about a transverse axis with respect to a normal forward direction of travel;
a cutting header detachably supported on the feederhouse;
an axial flow crop processor with a rotor mounted for rotation inside a rotor housing arranged substantially longitudinally with respect to the harvester;
a feed beater mounted for rotation on a substantially transverse axis upstream of the feederhouse, crop processor, the feed beater operable to tangentially impel crop material into the crop processor;
a drive system for driving the rotor and the feed beater; and
a drive connection between the rotor and the feed beater, wherein the rotor comprises a drum mounted upon a rotor shaft and wherein the drive connection comprises a first spur gear that is keyed to the rotor shaft in front of the drum, a first transfer shaft that is journaled for rotation on an axis that is parallel to the rotor, a second spur gear keyed to the first transfer shaft and meshed with the first spur gear, a first bevel gear keyed to the first transfer shaft, a second transfer shaft journaled for rotation on a substantially transverse axis, a second bevel gear keyed to the second transfer shaft and meshed with the first bevel gear, and a torque transfer connection between the second transfer shaft and the feed beater.

2. The combine harvester of claim 1, wherein the drive system includes a rotor drive device for transmitting torque from a drive stage to the rotor shaft, wherein the rotor drive device is connected to a rear end of the rotor and comprises a transverse driveshaft driven by the drive stage and a gearbox arranged to transfer motion from the transverse driveshaft to the rotor shaft, and wherein torque is transmitted to the feed beater via the rotor shaft.

3. The combine harvester of claim 2, wherein the axial flow crop processor comprises a pair of rotors mounted side-by-side for rotation inside respective rotor housings arranged substantially longitudinally with respect to the harvester, wherein the drive connection is connected to only one of the rotors.

* * * * *